United States Patent [19]
Herbert

[11] Patent Number: 5,557,708
[45] Date of Patent: Sep. 17, 1996

[54] METHOD AND APPARATUS FOR OUTPUTTING A BINARY BIT DATA MESSAGE FROM BYTES REPRESENTING STRINGS OF CONTIGUOUS BITS OF EQUAL VALUE

[75] Inventor: Raymond J. Herbert, Leigh-on-Sea, United Kingdom

[73] Assignee: Neopost Ltd., Essex, United Kingdom

[21] Appl. No.: 761,397

[22] Filed: Sep. 18, 1991

[30] Foreign Application Priority Data

Sep. 21, 1990 [GB] United Kingdom ................. 9020596

[51] Int. Cl.$^6$ ........................................... G06K 15/00
[52] U.S. Cl. ........................ 395/108; 395/110; 395/101
[58] Field of Search ............................. 395/114, 407, 395/108, 132, 166, 325, 425, 725; 358/261.1, 261.2, 261.3, 261.4, 426; 364/464.01, 464.02, 464.03, 464.04; 371/37.1, 42; 382/41

[56] References Cited

U.S. PATENT DOCUMENTS

| | | | |
|---|---|---|---|
| Re. 32,226 | 8/1986 | Fuller | 364/464.02 |
| 2,909,601 | 10/1959 | Fleckenstein et al. | 178/6.8 |
| 2,963,551 | 12/1960 | Schreiber et al. | 179/15.55 |
| 2,978,535 | 4/1961 | Brown | 178/6 |
| 3,185,823 | 5/1965 | Ellersick et al. | 235/154 |
| 3,502,806 | 3/1970 | Townsend | 178/7.1 |
| 3,560,639 | 2/1971 | Centanni | 178/6 |
| 3,927,251 | 12/1975 | White et al. | 178/6 |
| 4,185,302 | 1/1980 | Mounts et al. | 358/261.2 |
| 4,194,606 | 3/1980 | Beneke | 192/18 A |
| 4,228,467 | 10/1980 | de Loye et al. | 358/261 |
| 4,461,212 | 7/1984 | Geney | 101/407.1 |
| 4,481,604 | 11/1984 | Gilham | 364/464.02 |
| 4,585,218 | 4/1986 | Williams | 271/10.04 |
| 4,652,330 | 3/1987 | Gerbaud | 156/361 |
| 4,675,841 | 6/1987 | Check, Jr. et al. | 364/464.02 |
| 4,688,051 | 8/1987 | Kawakami et al. | 395/108 |
| 4,724,759 | 2/1988 | Gilham | 101/91 |
| 4,735,138 | 4/1988 | Gawler | 101/91 |
| 4,737,924 | 4/1988 | Miki | 395/108 |
| 4,746,941 | 5/1988 | Pham et al. | 395/108 |
| 4,752,950 | 6/1988 | LeCarpentier | 379/106 |
| 4,757,532 | 7/1988 | Gilham | 380/23 |
| 4,759,283 | 7/1988 | Gilham | 101/91 |
| 4,780,601 | 10/1988 | Vermesse | 235/375 |
| 4,813,802 | 3/1989 | Gilham | 400/74 |
| 4,821,644 | 4/1989 | Gawler | 101/486 |
| 4,840,696 | 6/1989 | Krasuski | 156/353 |
| 4,845,662 | 7/1989 | Tokumitsu | 395/425 |
| 4,865,678 | 9/1989 | Peyre | 156/356 |

(List continued on next page.)

FOREIGN PATENT DOCUMENTS

| | | |
|---|---|---|
| 0050338 | 4/1982 | European Pat. Off. . |
| 0166023 | 1/1986 | European Pat. Off. . |
| 8501174 | 3/1985 | WIPO . |

OTHER PUBLICATIONS

Y. Ofek, "The Conservative Code for Bit Synchronization", IEEE Trans. Commun., vol. 38, No. 7, Jul. 1990 pp. 1107–1113.

Foley, J. D. & A. Van Dam, Fundamentals of Computer Graphics, Addison–Wesley Pub. Co. Reading MA 1984 pp. 498–499.

*Primary Examiner*—Mark R. Powell
*Assistant Examiner*—U. Chauhan
*Attorney, Agent, or Firm*—Shoemaker and Mattare, Ltd.

[57] ABSTRACT

A method and apparatus for transmitting print data signals serially to a printing device is disclosed. Print data for printing dots selectively line by line is stored as a plurality of bytes in which each byte represents the number of contiguous binary bits to be output to the printing device having the same binary value. The bytes are output to a comparator which receives the output of a counter driven by clock signals. The counter is started when a byte is output and the clock signals clock a data line held at a level representing the value of the bits. When the count equals the byte, the comparator toggles the data line so that it is at a level representing the next binary bits to be output. The apparatus is disclosed for use in a franking machine.

15 Claims, 3 Drawing Sheets

U.S. PATENT DOCUMENTS

| | | | |
|---|---|---|---|
| 4,886,566 | 12/1989 | Peyre | 156/361 |
| 4,905,156 | 2/1990 | Vermesse | 364/464.02 |
| 4,907,271 | 3/1990 | Gilham | 380/25 |
| 4,916,626 | 4/1990 | Vermesse | 364/480 |
| 4,917,010 | 4/1990 | Gilham | 101/93.04 |
| 4,918,601 | 4/1990 | Vermesse | 364/464.02 |
| 4,924,240 | 5/1990 | Herbert | 347/217 |
| 4,928,244 | 5/1990 | Vermesse | 364/464.02 |
| 4,928,249 | 5/1990 | Vermesse | 395/110 |
| 4,931,943 | 6/1990 | Vermesse | 364/464.02 |
| 4,933,706 | 6/1990 | Abumehdi | 355/326 M |
| 4,934,846 | 6/1990 | Gilham | 400/104 |
| 4,969,127 | 11/1990 | Gilham | 347/209 |
| 4,984,191 | 1/1991 | Vermesse | 364/464.02 |
| 5,020,428 | 6/1991 | Gawler | 101/91 |
| 5,022,088 | 6/1991 | Hisada et al. | 382/41 |
| 5,077,792 | 12/1991 | Herring | 380/24 |
| 5,113,266 | 5/1992 | Sugiura | 358/426 |
| 5,121,432 | 6/1992 | Gilham | 380/51 |
| 5,122,962 | 6/1992 | Gilham | 364/464.02 |
| 5,122,967 | 6/1992 | Gilham | 364/479 |
| 5,128,875 | 7/1992 | Abumehdi | 364/464.02 |
| 5,166,883 | 11/1992 | Gilham | 364/464.02 |
| 5,189,442 | 2/1993 | Herbert | 347/2 |
| 5,196,945 | 3/1993 | Ho et al. | 358/426 |
| 5,202,834 | 4/1993 | Gilham | 364/464.02 |
| 5,206,812 | 4/1993 | Abumehdi | 364/464.02 |
| 5,283,744 | 2/1994 | Abumehdi et al. | 364/424.02 |
| 5,302,825 | 4/1994 | Abumehdi | 250/271 |
| 5,323,323 | 6/1994 | Gilham | 364/464.02 |
| 5,408,416 | 4/1995 | Gilham | 364/464.02 |

METHOD AND APPARATUS FOR OUTPUTTING A BINARY BIT DATA MESSAGE FROM BYTES REPRESENTING STRINGS OF CONTIGUOUS BITS OF EQUAL VALUE

BACKGROUND OF THE INVENTION

This invention relates to a method of data transmission and in particular to a method of outputting data signals to a printing device.

Printing devices capable of selectively printing dots in a row are used to print characters or a graphic pattern by repeatedly operating the printhead in a succession of print cycles to print selected dots in a succession of rows on a print receiving medium. An example of such a printing device is a thermal dot printhead. Thermal dot printheads comprise a row of resistive print elements through which electric current is passed selectively to heat selected elements. The heated elements of the printhead cause an impression to be printed on a medium either by an ink transfer process in which ink carried by a backing layer is caused to be removed from the backing layer and deposited on the print receiving medium or by direct thermal activation of a heat sensitized medium. Each print element is capable of printing a dot on the medium in a line aligned with the row of print elements. Printing of characters or graphic patterns is effected by relative movement between the printhead and the medium in a direction transverse to the row of print elements during which the print elements are selectively heated to build up the required impression line by line. Energization of the print elements is controlled by means of a register having a plurality of stages corresponding in number to the number of print elements. Each stage of the register is associated with a different one of the print elements respectively. For each line of printing, the stages of the register are loaded with a binary digit representing energization or non-energization of the corresponding print element. For example print elements associated with stages loaded with binary one will be energized while print elements associated with stages loaded with binary zero will not be energized.

It has been proposed to use thermal printheads in postage franking machines to effect printing of a franking impression on items of mail. A printhead for such use is proposed to provide a resolution of 8 dots/mm and to have a printing width of 30 mm. Consequently such a head is provided with 240 energizable print elements and requires a register having 240 stages into which a corresponding number of print data bits must be loaded for each line of dots to be printed. For any given print speed, i.e. rate of printing line by line, there is a maximum time interval for the loading of the print data. While parallel loading of the register enables the print data to be loaded in the duration of this time interval even for relatively high speeds of printing, generally, commercially available thermal print heads are designed for serial loading of the print data. Furthermore parallel loading of the data requires complex and costly electronic circuits and if error checking of the print data is required it is more convenient and less costly if only a single serial data line needs to be checked. Accordingly it is desirable to load the print data into the register serially bit by bit for each line of printing. However it is desired to be able to print lines of dots at a rate for which the load time interval is only 2 ms for a line of 240 data bits and hence the load time is only 8.3 us per bit of print data. In practice a safety margin is required and for this printing speed the load time for each bit would need to be reduced to approximately 6 to 7 us. Usually electronic circuits of a franking machine include a micro-processor which carries out accounting and control functions of the machine and the operation of the microprocessor imposes limitations on the rate at which print data for controlling energization of the print elements of the printhead can be output. Print data is usually stored as a bit map in which each possible dot position of an impression to be printed is represented by a binary data bit in a bit map. This requires the provision of a substantial number of storage locations in memory. Conventionally the microprocessor is required to output information for each bit of print data sent to the printhead. Typically six instructions are required to be executed by the microprocessor for the output of each bit of print data. Thus for a printhead with 240 print elements, output of print data defining a line of print the microprocessor is required to execute 1440 instructions.

SUMMARIES OF THE INVENTION

According to one aspect of the invention a method of data transmission comprises representing a multi-bit data message as a plurality of bytes, each byte representing a string of contiguous bits of the message having the same binary value; outputting the bits of the message in a succession of cycles corresponding to the respective bytes by generating in each cycle a train of clock signals corresponding in number to the value of the byte corresponding to the current cycle while setting a data line to a binary value corresponding to the value of the string of bits represented by the current byte.

According to a second aspect of the invention a method of data transmission comprises the steps of storing a multi-bit data message as a plurality of bytes, each byte representing a string of contiguous bits having the same binary value; setting a data line to a state representing the binary value of the string of bits represented by a first byte; enabling a source of clock signals; driving a counter with said clock signals and clocking the state to which said data line is set to a data receiving device; disabling the clock signals when the state of the counter corresponds to the first byte; carrying out the aforesaid steps of setting the data line, enabling and disabling the clock signals for each of the bytes after said first byte of the plurality.

A preferred use of the methods of the invention is for outputting of print data signals to a printhead, and in particular to a thermal dot printhead. The method may be used in a franking machine for output of print data for effecting printing of a franking impression.

The invention also envisages apparatus for carrying out the method.

According to another aspect of the invention data transmission apparatus includes a data output line; memory means to store a plurality of data bytes, each byte representing a number of contiguous bits having the same binary value in a string of bits to be transmitted on said data output line; a counter; a source of clock signals; clock means operable to input a train of clock signals from said source to said counter; comparison means; means to output said data bytes from said memory means one at a time sequentially to said comparison means; drive means to hold said data output line selectively at first and second levels representing binary zero and binary one respectively to transmit for each clock signal a binary bit represented by the level of the output line; said comparison means being responsive to the data byte output from said memory means and a count output from said counter and being operative in response to said count being equal to said data byte output from said memory to output a control signal to control the drive means to switch the data output line from one of said first and second levels to the other of said first and second levels.

According to a further aspect of the invention data transmission apparatus includes a microprocessor for generating print data to be output to a printer device; a print data output line connecting the printer device to the microprocessor; a memory; said microprocessor being operable in a printing routine to write a plurality of data bytes to said memory representing a string of print data signals to control the printer device to print dots at selected positions in a line, each byte representing a group of contiguous print data signals to be output on said print data line having the same binary value; a counter; a source of clock signals connected to said counter and to said printer device; comparison means; said microprocessor being operable in said printing routine to read said data bytes from said memory and to apply said data bytes serially one at a time to said comparison means and to enable the source of clock signals each time a data byte is applied to the comparison means; said comparison means being operative in response to a count of clock signals by said counter reaching equality with the value of the input data byte to disable the source of clock signals and to output to the microprocessor a data line control signal; said microprocessor being operative to hold the print data line at one of first and second levels representing binary one and binary zero respectively and in response to said data line control signal to switch the other of said first and second levels; said clock signals being effective in combination with the level of the print data line to input print data signals to the printer device.

BRIEF DESCRIPTION OF THE DRAWINGS

An embodiment of the invention will now be described by way of example with reference to the drawings in which.

DESCRIPTION OF THE PREFERRED EMBODIMENT

Figure 1:
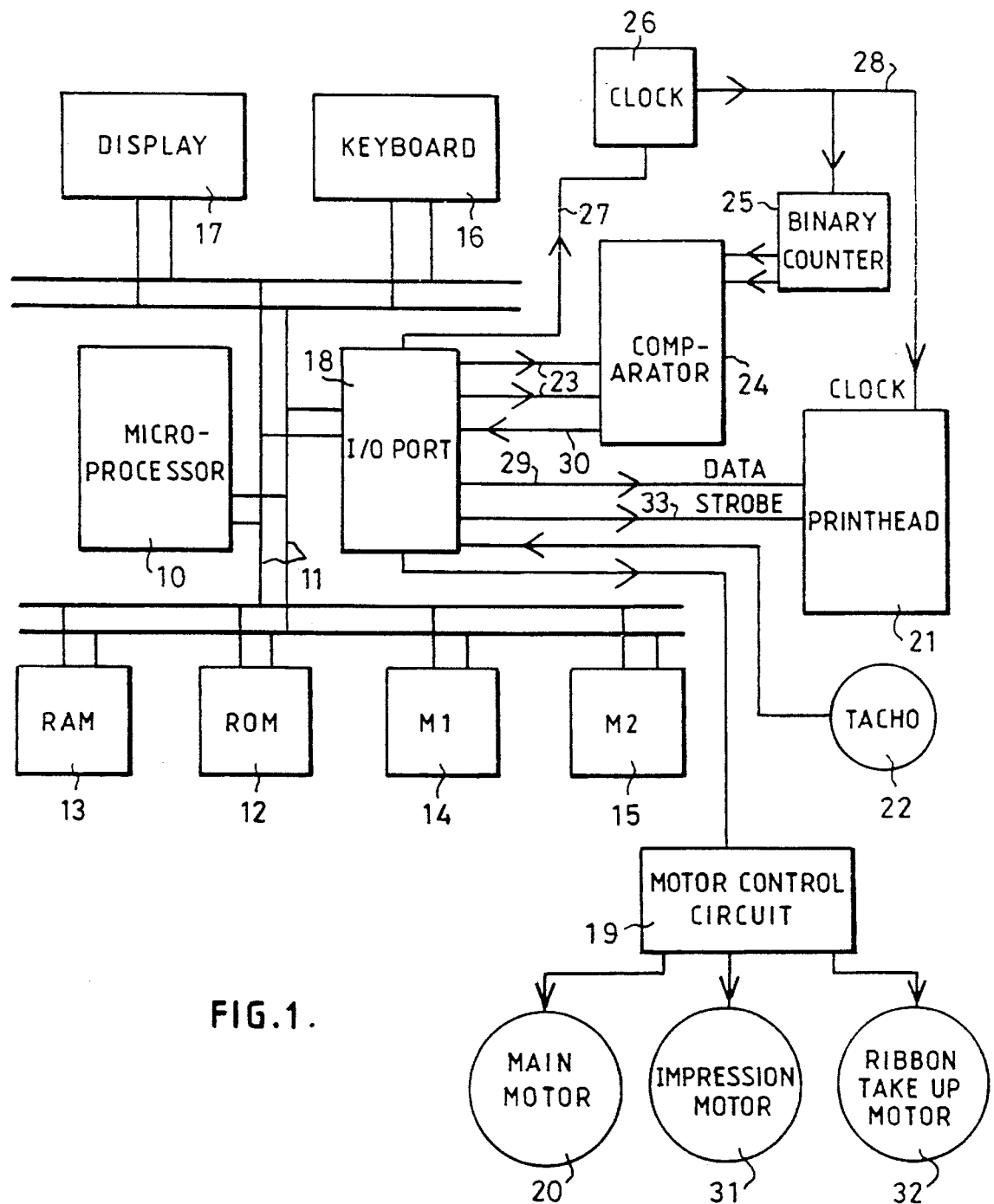
FIG. 1 is block circuit diagram of a postage franking machine.

Referring first to FIG. 1, a microprocessor 10 is connected to a bus 11 to which a number of peripheral and memory devices are connected. The microprocessor is operable under program sequences stored in a read only memory (ROM) 12 to carry out accounting and control functions of the franking machine. A random access memory 13 is connected to the bus and is utilized by the microprocessor as a working store. Postage accounting data relating to usage of the franking machine in franking postal items is stored in non-volatile memories 14, 15 also connected to the bus 11. For purposes of security and maintenance of integrity of the accounting data in the event of a mal-function, the accounting data is stored in duplicate in each of the memories 14, 15. Usually the accounting data comprises a value of credit available for use in franking, a tote value which is the accumulated value of postage used in franking items, a count of the number of items franked and a count of the number of items franked with a postage charge in excess of a predetermined value. Input of values of postage charge required to be franked, other data and commands to control operation of the machine is effected by means of a keyboard 16 connected to the bus 11. A display device 17 connected to the bus is operated by the microprocessor to echo keyboard entries of postage values and to display information to assist users in uses of the machine. An input/output port 18 connected to the bus handles transmission of signals output from the microprocessor to other devices and of signals input to the microprocessor from those devices. A motor control circuit 19 is controlled by signals output via the input/output port 18 to control energization of a main drive motor 20 of means for feeding mail items past a printhead 21. The control circuit also controls operation of an impression control motor 31 which effects application of pressure to urge mail items toward the printhead so that a thermal transfer ribbon interposed between the printhead and the mail item is pressed into ink transfer engagement with the mail item. The thermal transfer ribbon is drawn by its engagement with the mail item past the printhead and the used ribbon is wound onto a take up spool or reel driven by a take up motor 32 controlled by control circuit 19. Feeding of the mail items is sensed by means of a tachometer 22 which inputs signals to the microprocessor via the input/output port 18 to synchronize the line by line printing of the franking impression with the feeding of the mail items.

The thermal printhead 21 is connected to the input/output port 18 so as to receive multi-bit data messages comprising print data signals and strobe signals from the microprocessor 10. When printing is to be effected, the microprocessor loads print data defining a plurality of lines of print to form a franking impression to be printed in memory, which may be RAM 13, and outputs successive lines of this print data in a succession of print cycles, one line of data being output in each cycle. When a line of print data has been output to the printhead and loaded in the printhead register (not shown), a strobe signal from the microprocessor causes the print data in the printhead register to energize the printhead elements in dependence upon the print data. Successive lines of data are loaded into the printhead register in successive print cycles and the strobe signals cause energization of the elements. Output from the tachometer is utilized to synchronize the timing of the strobe signals with movement of the mail item as it is fed past the printhead so that the lines of print are evenly spaced along the mail item.

Figure 2:
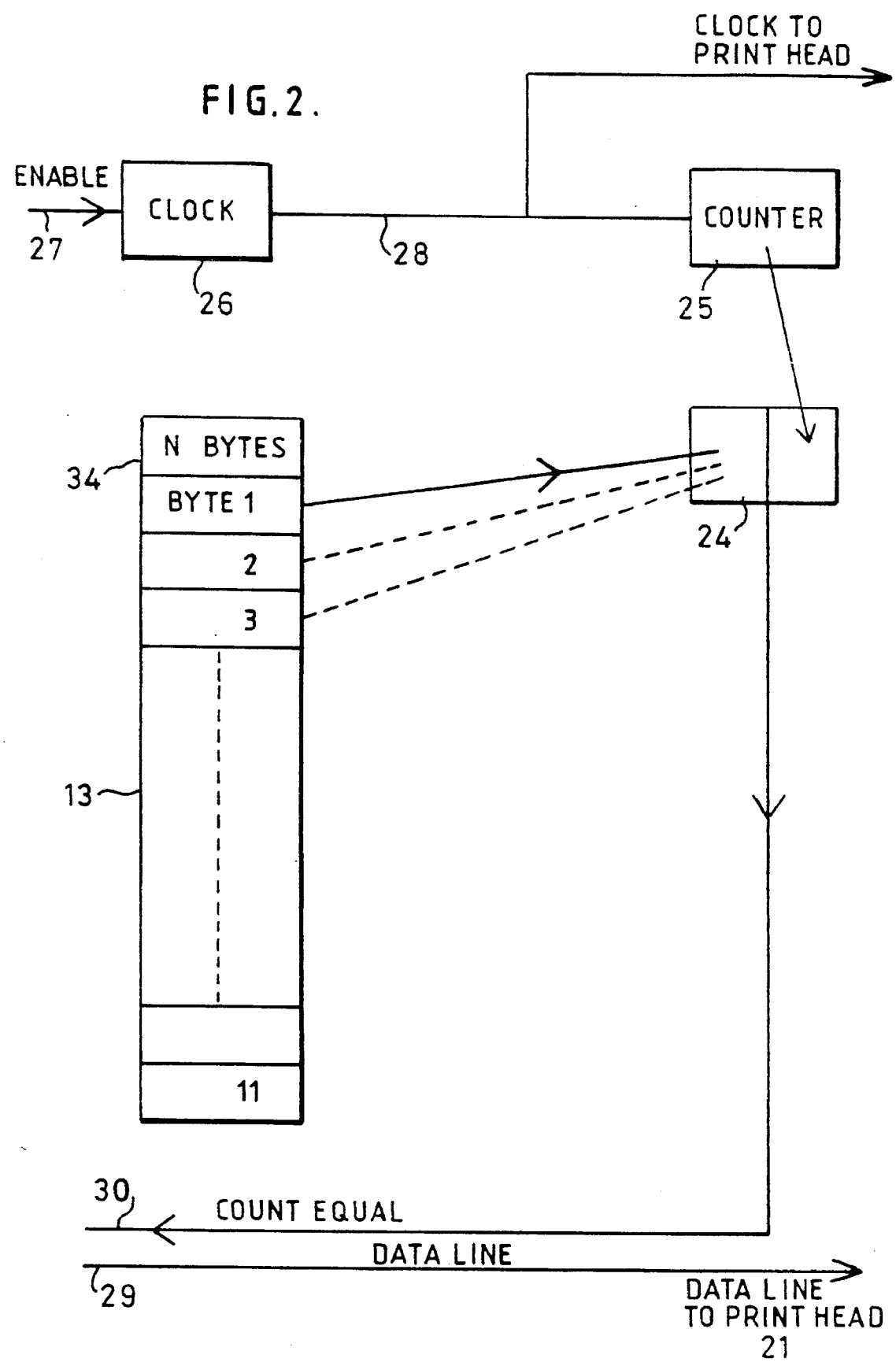
FIG. 2 is a block diagram illustrating output of print data to the printhead.
Figure 3:
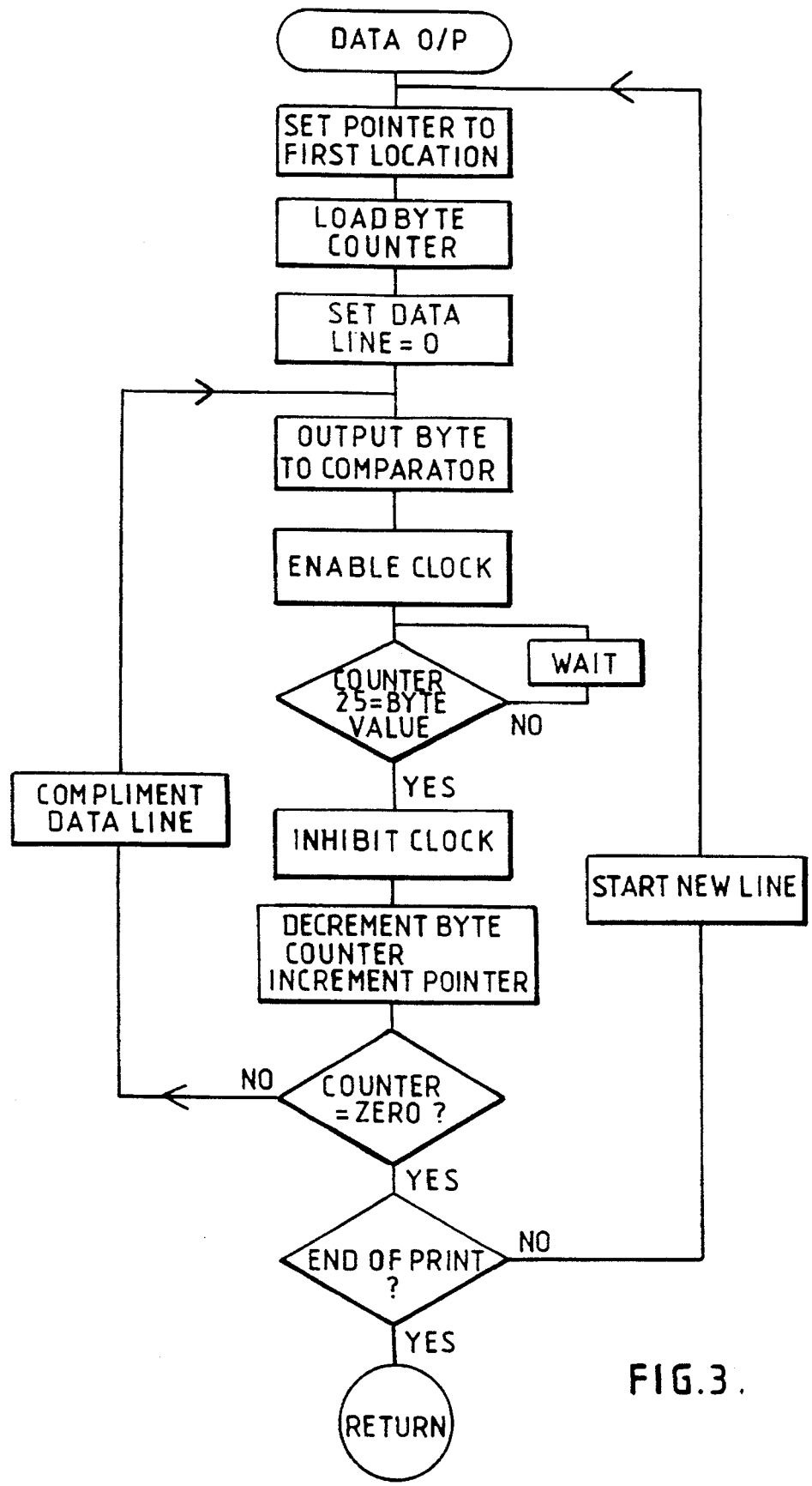
FIG. 3 is a flow chart illustrating the steps utilized in outputting print data.

In accordance with the present invention instead of storing the print data as a bit map, the print data for a line of print is stored in memory 13 as a number of bytes each corresponding respectively to a group of contiguous binary ones and zeros in the print data. The bytes are each of eight bits and the magnitude of each byte represents the number of print data bits in a string for the group of bits corresponding to the byte. The width of any franking impression to be printed is less than the overall width of the printhead and hence, with binary one representing a dot to be printed, the ends of a line of print data are always binary zeros. Accordingly the initial string of bits for a line of print data always consists of zeros and hence the first byte always represents a number of zeros. The second byte represent a number of ones, the third byte a number of zeros and so on alternately. It will be appreciated that lines of print data will be represented by different numbers of bytes in dependence upon the number of groups of contiguous zeros and ones in the data. The print data for a line of print also includes a number having a value equal to the number of bytes representing the print data for a line of print. As illustrated by the block diagram of FIG. 2 and the flow chart of FIG. 3, during a printing cycle the printing data for a line of print is output one byte at a time via the input/output port 18 and lines 23 to one side of an eight bit magnitude comparator 24. An input to the other side of the comparator 24 is from a counter 25. The counter is driven by clock signals from a clock generator 26 enabled by an enable signal on line 27. Clock signals from generator 26 are output on line 28 to clock data signals into the register of the printhead in dependence upon the state of a data line 29. Thus the count from counter 25 is equal to the number of data bits clocked to the printhead register. When the count from the counter is equal to the value of the byte loaded into the comparator 24, the comparator generates a count equal signal on line 30 which is sent via the input/output port 18 to the microprocessor to indicate that the required number of bits of one value have been sent to the printhead and that the next byte of print data requires loading into the comparator. The clock generator 26 is inhibited while loading is effected and the state of data line 29 is complimented so that it is toggled from its previous state while the previous byte was in the comparator to an opposite state. Thus after loading of a number, represented by the value of a byte, of data bits of one binary value the data line is toggled so that the next byte controls loading of a number of data bits of the other binary value. Upon completion of loading the data bits for a line of print, and at a time determined inter alia by output from the tachometer, the microprocessor outputs a strobe signal on line 33 to the printhead to effect energization of print elements in dependence upon the loaded print data to effect printing of a line of the required impression. The microprocessor sets a 34 count in storage location equal to the number of bytes representing print data for a line. This count is decremented by unity for each loading of a byte into the comparator. Inspection of the count by the microprocessor provides an indication of when loading of a complete line of print data has been accomplished.

Successive lines of print data are loaded and printing of successive lines of print is effected as hereinbefore described until the data for a complete required impression has been loaded and the complete impression printed.

The speed of data handling is enhanced because the microprocessor is required to generate an output only when the state of the data line is required to be toggled. For a typical franking impression this may occur approximately thirteen times for each line of print whereas for previous proposed methods of print data output the microprocessor has been required to generate an output for each bit of print data sent to the printhead. If the microprocessor is required to execute six instructions for each output generated, with the data transmission system described hereinbefore the microprocessor is required to execute only 78 instructions for a typical line of print forming a franking impression as compared with 1440 instructions when output is generated for each print data bit thereby providing a decrease in speed of data handling of approximately 20 times. An additional benefit is provided in that less memory space is required to store the bytes representing print data than would be required to store the print data in bit map form.

While the invention has been described hereinbefore by way of reference to an embodiment in which print data is output serially to a thermal print head, the method of data transmission in accordance with the invention may be used for transmission of print data to printing devices other than thermal print heads, for example print heads using other printing technologies to selectively print a plurality of dots in rows. Furthermore the method of date transmission may be utilized for transmission of date serially to devices other than print heads.

I claim:

1. A method of outputting a binary bit data message from bytes representing strings of contiguous bits of equal value comprising the steps of storing a data message comprising a plurality of binary bits as a plurality of bytes, each byte representing a string of contiguous bits having equal binary value; setting a data line to a state representing a first binary value of a first string of bits represented by a first byte; enabling a source of clock signals; driving a counter with said clock signals and clocking the state to which said data line is set to a data receiving device; disabling the clock signals in response to the counter having a state corresponding to the first byte; carrying out the aforesaid steps of setting the data line, enabling and disabling the clock signals for each of the bytes after said first byte of the plurality of bytes.

2. A method of data transmission as claimed in claim 1 in which the data receiving device comprises a printhead having a row of selectively operable print elements and in which the data message comprises print data defining operation of the print elements to print a line of a print impression.

3. The method as claimed in claim 2 wherein the data message comprises print data defining a line of a franking impression.

4. A method as claimed in claim 1 wherein the pluarlity of bytes of the data message comprises a predetermined number of bytes including the steps of setting a value to correspond to said determined number of bytes and decrementing said value by unity in correspondence with each successive transmission of data represented by one of said bytes.

5. Apparatus for outputting a binary bit data message from bytes representing strings of contiguous bits of equal value including a data output line connected to a data receiving device;

memory means to store a plurality of data bytes, each byte representing a number of contiguous bits having equal binary value in a string of bits to be transmitted on said data output line;

a counter;

a source of clock signals; clock means to enable the source to input a train of clock signals to said counter and to said data receiving device; comparison means;

means to output said data bytes from said memory means one said data byte at a time sequentially to said comparison means;

drive means operable to switch said data output line selectively between first and second levels representing binary zero and binary one respectively to transmit for each clock signal a binary bit represented by the level of the output line;

said comparison means being responsive to the data byte output from said memory means and a count output from said counter and being operative in response to said count being equal to said data byte output from said memory to output a control signal to operate the drive means to switch the data output line.

6. The apparatus as claimed in claim 5 including means to enable said clock means when a data byte is output to the comparison means and to disable said clock means in response to output of the control signal by the comparison means.

7. The apparatus as claimed in claim 5 for outputting print data signals comprising the string of binary bits including a data receiving device connected to the data output line; said string of binary bits being clocked to the data receiving device by the clock signals.

8. The apparatus as claimed in claim 5 including byte number means initially set to a number equal to the number of bytes representing the string of binary bits; and including means to decrement said number in response to output of each byte to the comparison means to provide an indication when transmission of the string of bits has been effected.

9. The apparatus as claimed in claim 5 wherein at start of transmission of a string of binary data bits the data output line is held at a level representing a predetermined one of said binary values.

10. The apparatus as claimed in claim 5 for outputting print data signals comprising the string of binary bit defining a franking impression from an electronic accounting and control circuit of a franking machine to a data receiving device of the franking machine.

11. Apparatus for outputting a binary bit data message from bytes representing strings of contiguous bits of equal valve including a microprocessor for generating print data to be output to a printer device;

a print data output line connecting the printer device to the microprocessor;

a memory;

said microprocessor being operable in a printing routine to write a plurality of data bytes to said memory representing a string of print data signals to control the printer device to print dots at selected positions in a line, each byte having a value representing a group of contiguous print data signals to be output on said print data output line having equal binary value;

a counter;

a source of clock signals connected to said counter and to said printer device;

comparison means;

said microprocessor being operable in said printing routine to read said data bytes from said memory and to apply said data bytes serially one at a time to said comparison means and to enable the source of clock signals each time a data byte is applied to the comparison means;

said comparison means being operative in response to a count of clock signals by said counter reaching equality with the value of the data byte applied to the comparison means to disable the source of clock signals and to output to the microprocessor a data line control signal;

said microprocessor being operative to hold the print data line at a first one of first and second levels representing binary one and binary zero respectively and in response to said data line control signal to switch said print data line to a second one of said first and second levels;

said clock signals being effective in combination with said first and second levels of the print data output line to input print data signals to the printer device.

12. Data transmission apparatus as claimed in claim 11 wherein the level of the print data line initially is held at a predetermined one of the first and second levels.

13. Apparatus as claimed in claim 11 wherein the plurality of data bytes written to the memory comprises a determined number of bytes and wherein the memory includes byte number means initially set by the microprocessor to a number corresponding to said determined number, and including means to decrement the number in the byte number means for each data byte read out to the comparison means and to inspect the number in the byte number means after each data byte is read out to determine if all of the print data string has been transmitted to the printer device.

14. Apparatus for outputting a binary bit data message from bytes representing strings of contiguous bits of equal valve including a data output line connected to a data receiving device;

memory means to store at least first, second and third data bytes, said first data byte having a first value representing a first number of contiguous binary bits of a first group having a first binary value in a string of binary bits to be transmitted to said data receiving device, said second data byte having a second value representing a second number of contiguous binary bits of a second group having a second binary value in said string of binary bits, and said third data byte having a third value representing a third number of contiguous binary bits of a third group having said first binary value in said string of binary bits, a counter;

a source of clock signals; clock means to input a train of said clock signals from said source to said counter and to said data receiving device; comparison means;

means to output said first data byte, said second data byte and said third data byte sequentially from said memory means to said comparison means;

drive means operable to switch said data output line between a first level representing said first binary value and a second level representing said second binary value, said data output line initially being at said first level; said comparison means being responsive to said first data byte output from said memory means and a first count of said counter in a first cycle and being operative in response to said first count being equal to said first value of said first data byte to operate said drive means to switch said data output line from said first binary value to said second binary value; said comparison means being responsive to said second data byte output from said memory means and a second count of said counter in a second cycle and being operative in response to said second count being equal to said second value of said second data byte to operate said drive means to switch said data output line from said second level to said first level and said comparison means being responsive to said third data byte output from said memory means and a third count of said counter in a third cycle and being operative in response to said third count being equal to said third value of said third data byte to operate said drive means to switch said data output line from said second binary value to said first binary value.

15. The apparatus as claimed in claim 14 wherein the clock means is operated to output clock signals from the source of clock signals to the counter and to the data receiving device in response to input respectively of the first data byte, the second data byte and the third data byte to the comparison mean and said clock means is disabled in response to said first count being equal to said first data byte value and in response to said second count being equal to said second data byte value.

* * * * *